United States Patent

[11] 3,540,366

[72] Inventor Michihiro Noguchi,
 Tokyo, Japan
[21] Appl. No. 723,126
[22] Filed April 22, 1968
[45] Patented Nov. 17, 1970
[73] Assignee Konica Camera Corporation
 Woodside, New York
[32] Priority Feb. 17, 1967, Nov. 10, 1967
[33] Japan
[31] 42/12,955 and 42/94,661
 Continuation-in-part of Ser. No.
 705,978, Feb. 16, 1968, abandoned.

[54] AUTOMATIC PARALLAX INDICATING MEANS FOR TWIN LENS REFLEX CAMERAS WITH INTERCHANGEABLE OBJECTIVES
 10 Claims, 3 Drawing Figs.
[52] U.S. Cl. ................................................... 95/44, 95/42
[51] Int. Cl. ............................................. G07b 13/12
[50] Field of Search ....................................... 95/44, 42, 11, 44A, 44B

[56] References Cited
UNITED STATES PATENTS
2,048,773 7/1936 Baumgartner................ 95/44
3,029,720 4/1962 Leitz et al..................... 95/44
3,356,003 12/1967 Eckhardt....................... 95/44
FOREIGN PATENTS
1,203,118 10/1965 Germany..................... 95/44

Primary Examiner—Norton Ansher
Assistant Examiner—Richard L. Moses
Attorney—Mc Glew and Toren ABSTRACT: A twin lens reflex camera with interchangeable objectives include a photographic objective, a finder objective, and an indicator which indicates the parallax between the finder objective and the photographic objective. A rod is movable parallel to the optical axis in accordance with adjustment of the photographic objective along the optical axis and operates a cam controlling the position of a parallax indicator. Each interchangeable objective has a pin or the like thereon correlated with its focal length, and the forward end of the rod engages this pin.

Patented Nov. 17, 1970

3,540,366

INVENTOR.
MICHIHIRO NOGUCHI
BY
McGlew & Toren
ATTORNEYS

AUTOMATIC PARALLAX INDICATING MEANS FOR TWIN LENS REFLEX CAMERAS WITH INTERCHANGEABLE OBJECTIVES

CROSS REFERENCE TO RELATED APPLICATION

This application is a continuation-in-part of copending U.S. Pat. application Ser. No. 705,978, filed Feb. 16, 1968, now abandoned, for AUTOMATIC PARALLAX INDICATING DEVICE FOR TWIN LENS CAMERAS WITH INTERCHANGEABLE OBJECTIVES.

BACKGROUND OF THE INVENTION

As is well known, twin lens reflex cameras have two optical axes spaced from each other, one being the optical axis of the photographing objective and the other being the optical axis of the finder objective. This results in parallax between an image in the finder and a picture taken by the photographic objective. The amount of such parallax depends on the distance to an object to be photographed and also on the focal lengths of interchangeable objectives.

With respect to twin lens reflex cameras having fixed objectives, there have been various proposals to provide an interlocking mechanism between focusing means and a parallax indicator, for obtaining, on a focusing screen, and indication of a correction for parallax, which varies with the distance to the object to be photographed.

However, with twin lens reflex cameras with interchangeable objectives, provision must be made to accommodate for the variation of the rate of change of the parallax, not only with the distance to the object to be photographed but also with the differing focal lengths of the interchangeable objectives.

Inasmuch as a parallax indicator is mounted on the camera body and an exchangeable objective is mounted on a movable part of the camera, it has been difficult to provide the possibility that the rate of change of parallax can be adjusted under any situation. A solution has been proposed in Japanese Pat. Publication No. 24155/1964, and this proposal is to vary the rate of change as objectives are interchanged. However, the proposal has the disadvantage that exchange of objectives must be effected at a particular position of the objectives, and that manual adjustment is required to bring the rate of change of the parallax into correspondence with the focal length of the new objective.

SUMMARY OF THE INVENTION

This invention relates to twin lens cameras and, more particularly, to novel apparatus for automatic indication of parallax in twin lens reflex cameras having interchangeable objectives.

In accordance with the invention, the apparatus includes a member pivoted to an objective-carrying component which is movable parallel to the optical axis of the camera. One end of this member is in contact with a pin on the objective carrying component, and the other end of the member has a cam surface. Another member is pivoted on the camera body and has one end in contact with the cam surface, with the other end of the other member serving to indicate, within a finder, the amount of parallax. The pin engaged by the member pivotally mounted on the objective-carrying component is respective to a particular interchangeable lens, corresponding, for example, to the focal length of the respective interchangeable lens.

The parallax indicator can be, for example, an indicating needle movable along or beneath a transparent plate, or it can be a parallax correction frame movable along a focusing screen and connected to the end of the member which is pivoted on the camera body.

An object of the invention is to provide an apparatus for always indicating the correct value of the parallax when an objective is advanced or retracted during focusing.

Another object of the invention is to provide such an apparatus, for twin lens reflex cameras, which permits free interchange of objectives independently of the relative extension or retraction of the objectives.

A further object of the invention is to provide apparatus, for twin lens reflex cameras, in which the rate of change of the parallax value is adjusted automatically as objectives having different focal lengths are interchanged.

Still another object of the invention is to provide a parallax indicating apparatus for twin lens reflex cameras which is simple in construction and reliable in operation.

BRIEF DESCRIPTION OF THE DRAWINGS

For an understanding of the principles of the invention, reference is made to the following description of typical embodiments thereof as illustrated in the accompanying drawings.

In the Drawings.

DESCRIPTION OF THE PREFERRED EMBODIMENTS

Figure 1:
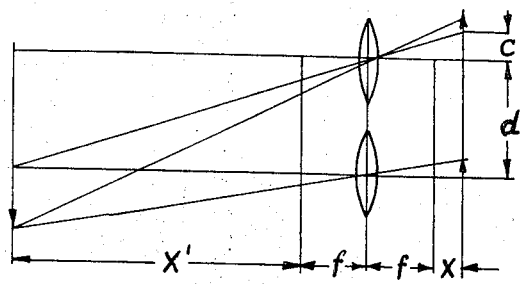
FIG. 1 is a graphical illustration of the fundamental principle of occurrence of parallax in twin lens cameras, having a finder objective and a photographic objective whose optical axes are space from each other.

Referring first to FIG. 1, the magnitude of parallax is designated as $c$, the spacing between the optical axes of upper and lower lenses is designated $d$, the magnitude of movement of the objectives is designated by $x$, the distance between the forward focal point and an object to be photographed is designated by $x'$, and the focal length is designated by $f$. From FIG. 1, there results the following general relation:

$$\frac{c}{d} = \frac{f+x}{f+x'}$$

and $$xx' = f^2$$

This may be written as:

$$c = \frac{d \cdot x}{f}$$

Since $d$ is constant for a camera, it follows that the magnitude of $c$ is directly proportional to $x$ and inversely proportional to $f$. Thus, a parallax indicating mechanism may be obtained by using a linear cam for interconnecting a parallax indicator with an objective-moving mechanism, and by causing the inclination of the linear cam to be varied in inverse proportion to the focal length.

In other words, the linear cam may be provided on a component which is moved with the objectives, and the inclination of the linear cam may be varied as the focal length of the objectives is changed, due to interchange of objectives. On the camera body, there is arranged a member for movement with contact with the cam, so that this member, or an element attached thereto, provides an indication of the magnitude of parallax. The present invention is based upon the above principle, and two embodiments thereof will be described with reference to FIGS. 2 and 3.

Figure 2:
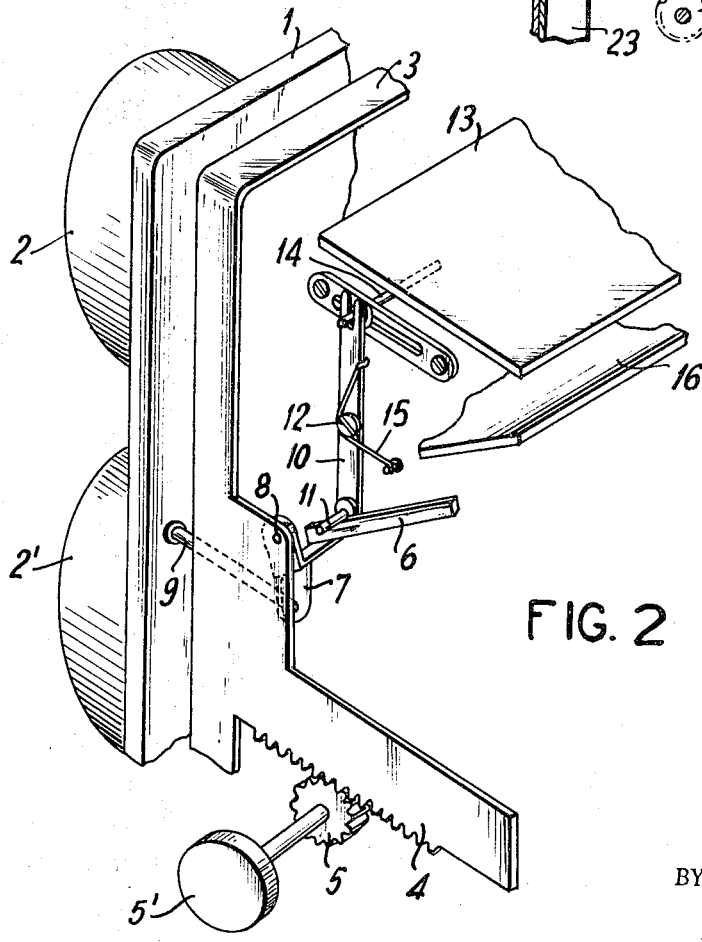
FIG. 2 is a perspective view of the essential parts of a twin lens reflex camera embodying one form of parallax indicating apparatus in accordance with the invention.

Referring first to FIG. 2, an interchangeable objective mount is indicated at 1 as arranged for mounting, on the camera, a finder objective 2 and a photographing objective 2'. Mount 1 is mounted on an objective-moving plate 3 having a rack 4 extending therefrom and engaged by a pinion 5 which may be rotated by a knob 5'. It will be noted that rotation of pinion 5 by knob 5' effects displacement of the interchangeable objective mount 1 parallel to the optical axes of the objectives.

A linear cam 6 is pivotally mounted at 8 on the objective-moving plate 3, and has an end 7 engaged with a pin 9. Pin 9 is secured to objective mount 1 for varying the inclination of linear cam 6, and the pins 9 on interchangeable objectives have different lengths corresponding to the focal lengths of the respective objectives. It will be noted that the free end of pin 9 abuts against the end 7 of linear cam 6 to vary the inclination of cam 6 in accordance with the focal length of the objectives mounted on a particular mount 1.

A lever 10, carrying a pin 11 at its lower end, is pivotally mounted on the camera body by pivot 12. Pin 11 engages linear cam 6, and the other end of lever 10 is forked to receive and move an indicator or needle 14 indicating the magnitude of parallax on a focusing screen 13. A spring 15 surrounds pivot 12 and has one end secured to the camera body and the other ends secured to lever 10 to bias lever 10 to rotate counterclockwise. By virtue of the bias exerted by spring 15, acting through the pin 11 on cam 6, linear cam 6 tends to rotate clockwise about its pivot 8 so that its end 7 is urged against pin 9. A reflecting mirror is indicated at 16, and directs light from finder objective 2 to focusing screen 13.

For focusing of the camera, pinion 5 is rotated by knob 5' to move plate 3 parallel to the optical axes, through the medium of rack 4, thereby moving mount 1. Depending on the direction in which rack 4 moves, linear cam 6 is bodily moved in one direction or the other so that pin 11 causes lever 10 to rotate about its pivot 12 either against the bias of spring 15 or under the bias of spring 15.

As mentioned above, the magnitude of parallax is proportional to the magnitude of movement of the lens systems, so that needle 14 always provides a correct indication of the magnitude of parallax when the inclination of linear cam 6 is maintained at a proper value in accordance with the respective focal lengths of the interchangeable objectives 2 and 2'. When the interchangeable objective mount 1 is replaced by another mount 1, mounting objectives having a different focal length, the mount 1 of the newly positioned objectives has a pin 9 of a length corresponding to the focal length of the objectives, and providing as inclination to linear cam 6 corresponding to the focal length of the new objectives.

Although, in the above description, it is stated that pins 9 are selected to have lengths corresponding to the respective focal lengths of the lens systems used, the inclination of linear cam 6 may be controlled by means other than the lengths of pins 9, such as by changing their shape or mounting position. Pin 11 on lever 10 moves along a circular path concentric with pivot 12, so that lever 10 does not provide a precisely proportional motion. However, the length or shape of lever 10 may be selected so that any resulting error may be held within reasonable tolerances for practical purposes. Alternatively, linear cam 6 may be changed to a slightly curved cam. When high precision is required, known means may be utilized to convert circular motion into linear motion.

Figure 3:
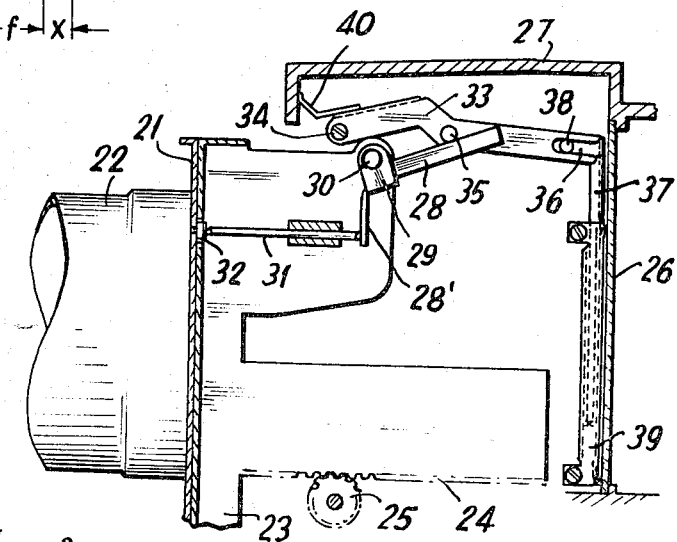
FIG. 3 is a somewhat schematic side elevation view illustrating essential parts of a twin lens camera incorporating another form of parallax indicating apparatus in accordance with the invention.

Referring to FIG. 3, which illustrates an alternative embodiment of the invention, a lens mount is indicated at 21 as mounting a finder objective 22 and a photographing objective, the latter not being shown for reasons of simplicity. Mount 21 is supported on an objective-moving plate 23 which has a rack extension 24 engaged by a pinion 25 which may be rotated in the same manner as mentioned for FIG. 2, in focusing the camera. Rotation of pinion 25 causes mount 21 to move parallel to the optical axes of the finder objective and the photographic objective.

A focusing screen is illustrated at 26 as arranged on camera body 27 to extend at right angles to the optical axis of finder objective 22. A linear cam 28 is pivotally mounted, at pivot 30, on objective-moving plate 23, the mounting portion of cam 28 being indicated at 29. A transmission rod 31 is slidably supported by objective-moving plate 23, and rod 31 engages a pin 32 secured to exchangeable objective mount 21, for correction of the initial inclination of linear cam 28. The pins 32 on different exchangeable objective mounts 21 have different lengths, depending on the focal length of the respective objectives.

The opposite end of rod 31 engages an end 28' of linear cam 28, for the purpose of varying the initial inclination of cam 28.

A lever 33 is pivoted at one end to the camera body 27 at pivot 34, and carries a pin 35 which engages linear cam 28. The opposite end of lever 33 is formed with an outwardly opening slot 36. A parallax correction frame 37 is arranged adjacent focusing screen 26, and a pin 38 attached to frame 37 is engaged in slot 36 of lever 33. Parallax correction frame 37 is guided in one or more guide rails 39, for displacement parallel to focusing screen 26. A spring 40 has one end secured to lever 33, and its opposite end abuts camera body 27, spring 40 biasing pin 35 carried by lever 33 into engagement with linear cam 28.

During focusing of the camera, pinion 25 is rotated to move rack 24 which, in turn, causes objective-moving plate 23 to move parallel to the optical axis of objective 22. At the same time, linear cam 28 pivotally mounted on plate 23 is bodily moved in a direction corresponding to the direction of movement of plate 23. Thereby, due to engagement between pin 35 and cam 28, lever 33 is turned either in the direction of bias or action of spring 40 or in opposition to the bias of spring 40. This effects displacement of parallax correction frame 37.

As previously mentioned, the magnitude of parallax is proportional to the magnitude of movement of the objective, so that frame 37 indicates the parallax correctly in focusing screen 26 when the inclination of linear cam 28 is adjusted to the proper value corresponding to the focal length of objective 22. When exchangeable objective mount 21 is replaced by another objective mount carrying objectives of a different focal length, the pin 32 on the new mount will have a length such as to provide a proper inclination to linear cam 28.

In the embodiment shown in FIG. 3, lever 33 is pivoted at one end to camera body 27 by means of pivot 34. However, it may be pivoted adjacent its center to camera body 27, so that one end carries pin 35 engaging linear cam 28 and the other end engages parallax correction frame 37. Also, while pins 32 on various objective mounts 21 have been described as selected to have lengths corresponding to the respective focal lengths, to provide a proper initial inclination to linear cam 28 in accordance with the respective focal length, the inclination of linear cam 28 may be controlled by other means such as by variation of pin shape or mounting position on objective mounts 21. Although the movement of pin 35 on lever 33 follows a circular path concentric with pivot 34, and thus may not have a correct proportional motion under certain circumstances, the length or shape of lever 33 may be changed suitably so that any resulting error is negligible for all practical purposes. Alternatively, linear cam 28 can be changed to a slightly curved cam. As mentioned in connection with the embodiment of FIG. 2, when high precision is required, known means may be used to convert circular movement to linear movement.

Thus, in accordance with the invention, interchangeable objective mounts carrying objectives of different respective focal lengths, need only be provided with inclination controlling pins of lengths corresponding to the respective focal lengths in order to provide proper inclination to the linear cam. Thereafter, an automatic indication of the correct magnitude of parallax is obtained when such objective mounts are interchanged on the objective-moving plate.

While specific embodiments of the invention have been shown and described in detail to illustrate the application of the principles of the invention, it will be understood that the invention may be embodied otherwise without departing from such principles.

I claim:

1. In a twin lens camera having a camera body, interchangeable objective assemblies, an objective assembly mounting member movable along said body parallel to the optical axis of the camera for focusing of the objective assemblies, and a focusing screen, apparatus for indicating the magnitude of parallax between the twin lenses comprising, in combination, an abutment on each objective assembly having a parameter coordinated with the respective focal length of the associated assemblies; linear cam means movably mounted on said mounting member for bodily movement with the latter during focusing, and engageable with the abutment of an objective assembly mounted on said mounting member for movement to an orientation corresponding to the focal length of said mounted objective assembly; cam follower means movably mounted on said camera body and engaged with said linear cam means for movement by the latter during focusing movement of said mounting member parallel to the optical axis; and a parallax indicator connected to said cam follower means and movable thereby along said focusing screen.

2. In a twin lens camera, apparatus for indicating the magnitude of parallax between the twin lenses, as claimed in claim 1, in which said abutments constitute pins each having a length corresponding to the respective focal length of the associated objective assembly.

3. In a twin lens camera having a camera body, interchangeable objective assemblies, an objective assembly mounting member movable along said body parallel to the optical axis of the camera, and a focusing screen, apparatus for indicating the magnitude of parallax between the twin lenses comprising, in combination, an abutment on each objective assembly having a parameter coordinated with the respective focal length of the associated assembly; linear cam means movably mounted on said mounting member for bodily movement with the latter and engageable with the abutment of an objective assembly mounted on said mounting member for movement to an orientation corresponding to the focal length of said mounted objective assembly; cam follower means movably mounted on said camera body and engaged with said linear cam means for movement by the latter during focusing movement of said mounting member parallel to the optical axis; and a parallax indicator connected to said cam follower means and movable thereby along said focusing screen; said abutments being pins each having a position on its respective objective assembly coordinated with the respective focal length of the associated objective assembly.

4. In a twin lens camera having a camera body, interchangeably objective assemblies, an objective assembly mounting member movable along said body parallel to the optical axis of the camera, and a focusing screen, apparatus for indicating the magnitude of parallax between the twin lenses comprising, in combination, an abutment on each objective assembly having a parameter coordinated with the respective focal length of the associated assembly; linear cam means movably mounted on said mounting member for bodily movement with the latter and engageable with the abutment of an objective assembly mounted on said mounting member for movement to an orientation corresponding to the focal length of said mounted objective assembly; cam follower means movably mounted on said camera body and engaged with said linear cam means for movement by the latter during focusing movement of said mounting member parallel to the optical axis; and a parallax indicator connected to said cam follower means and movable thereby along said focusing screen; said linear cam means being a lever pivotally mounted on said mounting member and having a relatively elongated substantially linear cam surface, said lever, responsive to engagement with an abutment on a mounted objective assembly, being pivoted to an angular position corresponding to the focal length of said mounted objective assembly.

5. In a twin lens camera, apparatus for indicating the magnitude of parallax between the twin lenses, as claimed in claim 4, in which said cam follower means includes a lever pivotally mounted on said camera body and having said parallax indicator connected to one end thereof, and a cam follower on said last-named lever engaged with said substantially linear cam surface.

6. In a twin lens camera, apparatus for indicating the magnitude of parallax between the twin lenses, as claimed in claim 4, in which said lever is a two-arm lever pivoted on said mounting member intermediate its ends, one arm of said lever engaging an abutment and other arm having said substantially linear cam surface.

7. In a twin lens camera, apparatus for indicating the magnitude of parallax between the twin lenses, as claimed in claim 4, in which said lever is a two-arm lever with one arm being formed with said substantially linear cam surface; and a transmission rod slidably mounted on said mounting member and having one end engaged with the other arm of said lever and its opposite end engageable with the abutment of a mounted objective assembly.

8. In twin lens camera, apparatus for indicating the magnitude of parallax between the twin lenses, as claimed in claim 6, in which said cam follower means comprises a second lever pivotally mounted, intermediate its ends, on said camera body, a pin at one end of said second lever engaged with said substantially linear cam surface, means biasing said second lever to maintain said pin engaged with said substantially linear cam surface, and a slot in the opposite end of said second lever engaged with said parallax indicator to move the latter along said focusing screen.

9. In a twin lens camera, apparatus for indicating the magnitude of parallax between the twin lenses, as claimed in claim 7, in which said cam follower means comprises a second lever pivotally mounted at one end on said camera body, a pin carried by said second lever intermediate its ends and engaged with said substantially linear cam surface, means biasing said second lever to maintain said pin engaged with said substantially linear cam surface, and a slot in the opposite end of said second lever receiving an element connected to said indicator for displacement of said indicator relative to said focusing screen.

10. In a twin lens camera, apparatus for indicating the magnitude of parallax between the twin lenses, as claimed in claim 9, in which said indicator is a frame movable parallel to said focusing screen; and guide means guiding movement of said frame.